July 11, 1961  E. A. MANGANELLO  2,992,038
TRUCKS WITH MOVABLE SIDE PLATES
Filed April 1, 1958
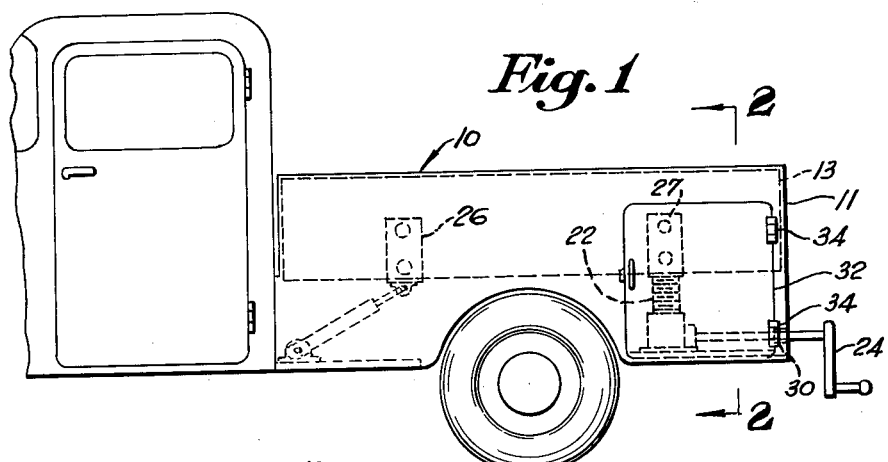
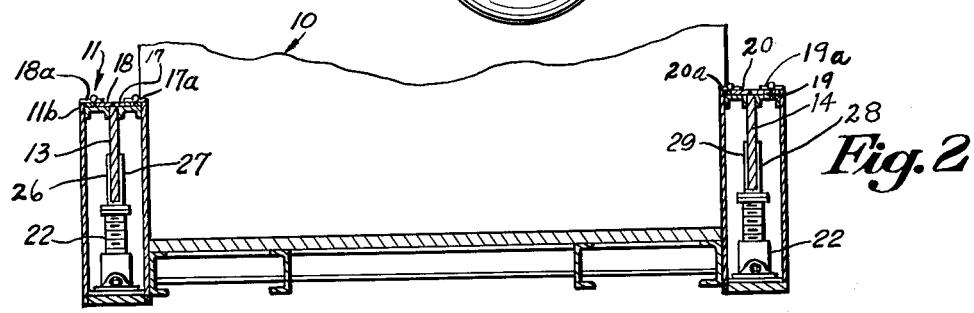
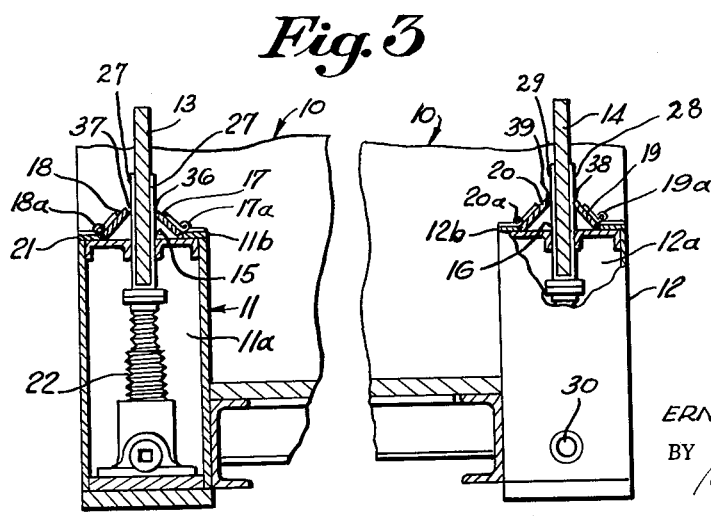
INVENTOR.
ERNEST A. MANGANELLO
BY Richards & Geier
ATTORNEYS

United States Patent Office 2,992,038
Patented July 11, 1961

2,992,038
TRUCKS WITH MOVABLE SIDE PLATES
Ernest A. Manganello, 149 S. Center St., Orange, N.J.
Filed Apr. 1, 1958, Ser. No. 725,681
1 Claim. (Cl. 296—36)

This invention relates to vehicle bodies, and refers more particularly to means for operating sideplates of trucks of the open body type, such as dump trucks, pickup trucks and the like.

Open body type vehicles are now provided with removable stakes having legs fastened or inserted manually through openings in the body wall. Whenever such supports, sideboards, or sideplates are no longer needed, they are either temporarily removed or allowed to remain exposed on the body for indefinite periods. This arrangement often causes the supports to be damaged unnecessarily through apparent non-use while driving the vehicle at high speeds, over rough terrain, or under other similar conditions. Ofttimes the height of the supports is in excess of the height normally required for the hauling operation. Consequently, the overall appearance of the vehicle does not add any uniformity to the load-carrying capacity of the vehicle.

It is an object, therefore, of the present invention to provide greater degrees of flexibility and of versatility in motor vehicles by positioning the sideplates not in use within or alongside of the truck body.

Another object of the present invention is to provide means for raising or lowering the sideplates into an operative or inoperative position within or alongside of the truck body wall, respectively.

A further object is to provide a greater degree of uniformity of appearance in an open type truck body provided with upright supporting means, sideboards, sideplates, and the like.

A general object of the present invention is to provide improved vehicle sideplates which are not subject to the above-mentioned disadvantages.

Other objects of the present invention will become apparent during the course of the following specification.

In the attainment of the aforesaid and other objectives, the inventive concept of the present invention may be realized through the provision of an open type vehicle body having two parallel side walls. A sideplate may be disposed alongside of and outside of each side wall, or within each hollow side wall compartment. By actuating a mechanical jack or a piston, the sideplate is raised or lowered into an operative or inoperative position, respectively. The actuating means may be disposed toward the rear or front portion of the truck body dependent upon the type of truck and the requirements of the driver.

Due to this arrangement, the sideplates remain indefinitely mounted on the truck body and are instantly retracted alongside of or within the side wall compartments of the truck body whenever the sideplates are not in use.

A fuller understanding of the present invention may be had by referring to the following description taken in conjunction with the accompanying drawings showing, by way of example, preferred embodiments of the inventive idea.

In the drawings:

FIGURE 1 is a side elevational view showing the mechanically operated sideplate lowered into the compartment of the side wall of an open type vehicle body.

FIGURE 2 is a section along the line 2—2 of FIGURE 1 showing the mechanically operated sideplate lowered into the compartment of the side wall.

FIGURE 3 is a sectional view showing the mechanically operated sideplate raised from the compartment of the side wall.

Referring now to the drawings in greater detail, wherein like reference numerals indicate like parts, reference numeral 10 indicates an open type vehicle body provided with two side walls 11 and 12. In accordance with an embodiment of the present invention, each of the side walls 11 and 12 is provided with hollow compartments 11a and 12a to accommodate retractable sideplates 13 and 14, respectively.

The sideplates 13 and 14 are preferably made of a metal alloy and are of sufficient size to maintain satisfactorily a greater load-carrying capacity than ordinarily possible dependent upon the type of vehicle and the requirements of the user.

The top surfaces 11b and 12b of each side wall 11 and 12 are provided with openings 15 and 16 (FIGURE 3), through which each sideplate 13 and 14 is raised or lowered into an operative or inoperative position. The openings 15 and 16 are provided with suitable closure means, such as two hinged doors 17, 18 and 19, 20, swingably fastened by means of hinges 17a, 18a and 19a, 20a to the top surfaces 11b and 12b, respectively, adjacent the openings 15 and 16 of each side wall 11 and 12.

The actuating mechanism according to the first embodiment of the present invention is a jack 22 manually operated by means of a crank 24.

The jack 22 is firmly secured to the sideplate 13, or sideplate 14, which is provided with reinforced side brackets 26, 27 and 28, 29 to maintain each sideplate 13, or sideplate 14 in a rigid upright position.

Practical experience has shown that the jack 22 is more satisfactorily used by positioning it toward the rear portion of the side wall 11, as shown in FIGURE 1, since in this arrangement the crank 24 is easily inserted into an opening 30 which is readily accessible at the rear end of the side wall 11, or side wall 12.

Whenever appropriate, a door 32 is provided with suitable fastening means 34 at one outer side surface of side wall 11, or sidewall 12 adjacent the jack 22, as shown in FIGURE 1.

It has also been found that the jack 22 may be conveniently positioned toward the forward end portion of the truck body, outside of and alongside of the side wall 11 or side wall 12, if desired. In this manner, an opening such as opening 30 in the side wall for inserting the crank therein to actuate the jack is avoided since the jack 22 is exposed alongside of each side wall and firmly mounted on each side wall base.

Whenever the sideplates 13 and 14 are placed into an operative position, the free ends 36, 37 and 38, 39 of the hinged doors 17, 18 and 19, 20 are inclined at an angle of approximately 45 degrees toward the sideplates 13 and 14, respectively, to serve as vertical support means, if desired.

It is apparent from this construction that other suitable closure means may be used satisfactorily in lieu of the two hinged doors 17, 18 and 19, 20. It may be constituted of, for example, a single door hinged at one side of the top surface 11b or 12b thereof.

The mechanical sideplate apparatus is operated as follows:

Normally, in a closed and inoperative position, the sideplates 13 and 14 are concealed within their respective compartments 11a and 12a. To raise the sideplate 13, for example, into an operative position, one end of the crank 24 is inserted into the opening 30 to actuate the jack 22. By turning the crank 24 in a clockwise direction, the jack 22 raises the sideplate 13 to the desired height dependent upon the number of crank revolutions. As the sideplate 13 is raised, the hinged doors 17 and 18 are automatically spread apart by contact with the sideplate 13 and with the doors. To lower the sideplate 13 into its respective compartment 11a, the crank 24 is turned in a counterclockwise direction, thereby retracting the sideplate 13 into its respective compartment 11a, while simultaneously causing the hinged doors 17 and 18 to close. The operation of sideplate 14 is similar to the operation described hereinabove for sideplate 13.

It will be understood that the present invention is not limited to the embodiment hereinabove described, but may lend itself to various changes which may be made within the scope of the appended claim.

What is claimed is:

A truck of the open body type, said truck having two side walls, at least one of said side walls consisting of two parallel spaced vertical side wall portions and a horizontal top portion extending between the upper ends of said vertical side wall portions, a hollow compartment being located between said side wall portions and said top portion, said top portion having an elongated opening, a retractable vertical side plate located in said compartment, side brackets firmly connected with said side plate for maintaining the side plate in an upright position, said side plate and said brackets being movable vertically through said opening from a lowermost position in which they are located entirely within said compartment to an uppermost position in which the side plate extends substantially above said compartment and said side brackets extend partly above and partly within said compartment, and vice versa, two doors closing said opening, hinges connecting said doors to said top portion, said doors closing said opening in said lowermost position of said side plate and being swung by said side plate to clear said opening and to engage said side brackets at an acute angle when said side plate is moved through said opening, and means connected with bottom portions of said vertical side plate and said side brackets for vertically reciprocating said side plate and said side brackets, said means consisting of a jack and means for cranking said jack.

References Cited in the file of this patent

UNITED STATES PATENTS

| | | |
|---|---|---|
| 991,140 | Davis | May 2, 1911 |
| 1,393,192 | Baker | Oct. 11, 1921 |
| 2,015,054 | Wikert | Sept. 17, 1935 |
| 2,206,334 | Rosner | July 2, 1940 |
| 2,797,956 | Schlotthauer et al. | July 2, 1957 |

FOREIGN PATENTS

| | | |
|---|---|---|
| 773,908 | France | Sept. 10, 1934 |
| 165,690 | Switzerland | Feb. 16, 1934 |